US008772371B2

(12) United States Patent  (10) Patent No.: US 8,772,371 B2
Bugnon et al.  (45) Date of Patent: Jul. 8, 2014

(54) PEARLESCENT PIGMENTS COATED WITH A METAL OXIDE/HYDROXIDE LAYER AND AN ACRYLIC COPOLYMER

(75) Inventors: Philippe Bugnon, Le Mouret (CH); Karin Karrer, Pfeffingen (CH); Patrice Bujard, Courtepin (CH)

(73) Assignee: BASF SE, Ludwigshafen (DE)

( * ) Notice: Subject to any disclaimer, the term of this patent is extended or adjusted under 35 U.S.C. 154(b) by 411 days.

(21) Appl. No.: 12/990,813

(22) PCT Filed: Apr. 28, 2009

(86) PCT No.: PCT/EP2009/055126
§ 371 (c)(1),
(2), (4) Date: Jan. 14, 2011

(87) PCT Pub. No.: WO2009/135784
PCT Pub. Date: Nov. 12, 2009

(65) Prior Publication Data
US 2011/0118384 A1 May 19, 2011

(30) Foreign Application Priority Data

May 9, 2008 (EP) .................................. 08155993

(51) Int. Cl.
*C09K 3/00* (2006.01)
(52) U.S. Cl.
USPC .......................... 523/175; 523/205; 523/210
(58) Field of Classification Search
CPC ........ C09D 11/037; C09D 5/032; C09D 5/36;
C09D 7/1225; C09D 7/1291; C09C 1/0021;
C09C 1/0024
USPC .......................................... 523/175, 205, 210
See application file for complete search history.

(56) References Cited

U.S. PATENT DOCUMENTS

| 4,814,020 | A | * | 3/1989 | Kieser et al. | 106/499 |
|---|---|---|---|---|---|
| 4,828,623 | A | | 5/1989 | Nitta et al. | |
| 5,091,011 | A | | 2/1992 | DeLuca | |
| 5,858,078 | A | * | 1/1999 | Andes et al. | 106/437 |
| 5,958,125 | A | * | 9/1999 | Schmid et al. | 106/417 |
| 6,139,613 | A | * | 10/2000 | Hendrickson et al. | 106/415 |
| 6,165,260 | A | * | 12/2000 | Gale | 106/439 |
| 6,340,723 | B1 | | 1/2002 | Nitta et al. | |
| 6,648,957 | B1 | * | 11/2003 | Andes et al. | 106/415 |
| 6,858,072 | B1 | | 2/2005 | Li et al. | |
| 2008/0249209 | A1 | | 10/2008 | Trummer | |
| 2009/0221739 | A1 | | 9/2009 | Knischka | |
| 2009/0234062 | A1 | | 9/2009 | Kok | |
| 2010/0178308 | A1 | | 7/2010 | Iwasa | |

FOREIGN PATENT DOCUMENTS

| DE | 1467468 | * | 12/1968 |
|---|---|---|---|
| DE | 1519116 | * | 3/1970 |
| DE | 3237264 | * | 4/1984 |
| DE | 3617430 | * | 11/1987 |
| DE | 4317019 | * | 12/1993 |
| DE | 10243438 | * | 3/2004 |
| EP | 0045851 | * | 2/1982 |
| EP | 0068311 | * | 5/1983 |
| EP | 0298604 | * | 11/1989 |
| EP | 0388932 | * | 9/1990 |
| EP | 0402943 | * | 12/1990 |
| EP | 0509352 | * | 10/1992 |
| EP | 0753545 | * | 1/1997 |
| EP | 0763537 | * | 3/1997 |
| EP | 0948572 | * | 10/1999 |
| EP | 0 982 376 | A | | 3/2000 |
| EP | 1028146 | * | 8/2000 |
| EP | 1213330 | * | 6/2002 |
| EP | 0948571 | * | 6/2003 |
| EP | 0882099 | * | 2/2004 |
| JP | 63-130673 | | 6/1988 |
| JP | 2548247 | | 10/1996 |
| JP | 2001-106937 | | 4/2001 |
| JP | 2001-220522 | | 8/2001 |
| JP | 2001-323217 | | 11/2001 |
| JP | 2007-204692 | | 8/2007 |
| WO | 93/08237 | * | 4/1993 |
| WO | 9739066 | * | 10/1997 |
| WO | 97/43348 | * | 11/1997 |
| WO | 97/46624 | * | 12/1997 |
| WO | 98/02266 | * | 1/1998 |
| WO | 98/38254 | * | 9/1998 |
| WO | 98/53011 | * | 11/1998 |
| WO | 98/53012 | * | 11/1998 |
| WO | 99/20695 | * | 4/1999 |
| WO | 99/48634 | * | 9/1999 |
| WO | 99/61529 | * | 12/1999 |
| WO | 00/42111 | A1 | | 7/2000 |
| WO | 2004/045755 | A | | 6/2004 |
| WO | 2004/092284 | A1 | | 10/2004 |
| WO | 2005056696 | * | 6/2005 |
| WO | 2006/074969 | A | | 7/2006 |
| WO | 2006136435 | * | 12/2006 |
| WO | 2007/017195 | A | | 2/2007 |
| WO | 2008/068152 | A | | 6/2008 |

OTHER PUBLICATIONS

English language machine-generated translation for JP2548247 (23 pages); 1996.
English language machine-generated translation for JP2001-323217 (10 pages); 2001.
English language machine-generated translation for JP2007-204692 (18 pages); 2007.

* cited by examiner

*Primary Examiner* — Edward Cain
(74) *Attorney, Agent, or Firm* — Shruti Costales

(57) ABSTRACT

The invention relates to pearlescent pigments comprising a platelet-shaped substrate, a metal oxide coating comprising a metal oxide layer having a refractive index of greater than 1.8 and a protective layer, wherein the protective layer comprises a metal oxide/hydroxide layer and optionally boroxide, applied to which is an organic aftercoat of an acrylic copolymer, to a method for producing said pigments and the use thereof. The outer layer provides a very good photo-stabilisation of the $TiO_2$ coated platelet-shaped substrates, such as mica, combined with a good water resistance and an anti-yellowing performance.

12 Claims, No Drawings

PEARLESCENT PIGMENTS COATED WITH A METAL OXIDE/HYDROXIDE LAYER AND AN ACRYLIC COPOLYMER

The invention relates to pearlescent pigments comprising a platelet-shaped substrate, a metal oxide coating comprising a metal oxide layer having a refractive index of greater than 1.8 and a protective layer, wherein the protective layer comprises a metal oxide/hydroxide layer and optionally boroxide, applied to which is an organic aftercoat of an acrylic copolymer, to a method for producing said pigments and the use thereof.

U.S. Pat. No. 4,814,020 relates to pigment preparations, in which a platelet-shaped nacreous pigment is coated with a polymer resin of a polyester/polyurethane block copolymer having tertiary amino groups and, if appropriate, plasticizers, solvents and surfactants.

DE4317019 discloses surface-modified nacreous pigments which are coated with 0.5-20% of a polymer compound of formula $-(CH_2-CM^1M^2)_n-$, or $-(-O-(CH_2)_x-O-CO-NH-(CH_2)_y-NH-CO-)-_n$, or an optionally substituted melamine resin, wherein $M^1$ is H, $C_{1-10}$alkyl, $-COOR$, $-NH_2$, $-COOH$ or $-CONH_2$; $M^2$ is H or $C_{1-10}$alkyl; R is $C_{1-10}$alkyl; x and y are 1-10; n>1000.

WO0159014 relates to surface-modified pearl pigments, wherein a hydrated metal oxide is covered on the surface of a pearl pigment, and fine polymer particles, chemically bonded to a hydrated metal oxide-coated pearl pigment without being mutally aggregated, are adhered to the surface of the outmost layer of said hydrated metal oxide-coated pearl pigment. The hydrated metal oxide is preferably a hydrated metal oxide comprising a metal selected from aluminum, zinc, calcium, magnesium, zirconium and cerium, and the amount thereof, in terms of metal oxide, is 0.1 to 20% by weight of the pearl pigment. In Examples 1 to 3 of WO0159014 a colloidal acrylic resin ("AE120" with a solid content of 36% by weight and an average particle diameter of 70 nm, JSR) is used.

DE10243438 discloses surface modified effect pigments based on a platelet substrate sheathed with at least one layer of immobilized LOST- and/or UCST-polymers. The process for the production of the effect pigments involves application of the LOST- and/or UCST-polymers onto the pigment surface by precipitation from water and/or an organic solvent and irreversible immobilization.

WO2006136435 relates to coated pearlescent pigments, whereby the coating covers the pearlescent pigments and comprises uncured, however, chemically cross-linkable and/or oligomeric and/or polymeric binding agent/s that can be cross-linked by heat, IR radiation, UV radiation and/or electron rays.

WO2005056696 relates to substrates with a surface modified by dyes, characterised in being enveloped in one or several layers of immobilised LOST (lower critical solution temperature polymers, become insoluble in the medium when the temperature is increased) and/or UCST (upper critical solution temperature polymers, become insoluble in the medium on cooling) polymers. The LOST polymers are preferably selected from the group consisting of polyalkylene oxide derivatives, olefinically modified PEO-PPO copolymers, polymethyl vinyl ether, poly-N-vinylcaprolactam, ethyl(hydroxyethyl)celluloses, poly(N-isopropylacrylamides) and polysiloxanes, and mixtures thereof. The UCST polymers are preferably selected from the group consisting of polystyrenes, polystyrene copolymers and polyethylene oxide copolymers, or mixtures thereof.

EP982376A2 describes plateletlike particles comprising a core and at least one coating layer ("nitrogen doped carbon coating") consisting essentially of a compound having from 60 to 95% by weight of carbon and from 5 to 25% by weight of nitrogen, the balance to 100% being selected from elements of the group consisting of hydrogen, oxygen and sulfur. In FIG. 3 of EP982376A2 a typical pigment structure is shown. The pigment of FIG. 3 consists of a plateletlike substrate with a nitrogen doped carbon coating around the core particle with an additional layer of $TiO_2$ between the nitrogen doped carbon coating and the core particle; and an additional layer of $SiO_2$ on the coating $TiO_2$. The nitrogen doped carbon coating neither represents an organic aftercoat of an acrylic copolymer nor a protective layer.

WO0042111A1 relates to a multilayer nacreous pigment which is based on a lamellar substrate consisting of a material with a low refractive index of between 1.35 and 1.8 and which has at least the following: (i) a first layer consisting of a material with a refractive index of more than 1.8; (ii) optionally, a second layer consisting of a material with a low refractive index of between 1.35 and 1.8; (iii) a semi-transparent metal layer which is applied to the substrate or to the layers (i) or (ii); and (iv); the substrate being lamellar silicon dioxide, aluminium oxide, boron oxide or magnesium fluoride. The material with a low refractive index of between 1.35 and 1.8 can be a polymer, such as, for example, an acrylate.

WO2007017195A2 relates to metal effect pigments comprising a coating and a lamellar substrate. The coating is provided with at least one mixed inorganic/organic layer which contains, at least in part, an inorganic network encompassing one or several inorganic oxide components, and at least one organic component which at least partly represents an organic oligomer and/or polymer that is covalently bonded at least in part to the inorganic network via one or several organic network formers. An inorganic network former may be, for example, a hydrolyzable metal salt or else a fully hydrolyzable organometallic compound. An organic network former is preferably an organometallic compound which is only partly hydrolyzable and so is unable to construct an inorganic network. The product of Example 1 has the following layer structure: $Al/Fe_2O_3/SiO_2$/a layer obtained by polymerization of Dynasylan MEMO (3-Methacryloxypropyltrimethoxysilane) and trimethylolpropane trimethacrylate (TMPTMA), Dynasylan OCTEO (octyltriethoxysilane) and 0.5 g of Dynasylan AMMO (3-aminopropyltrimethoxysilane).

WO2008/068152 relates to pigment based on (multiple) coated platelet-shaped substrates comprising a protective layer which is obtained by treatment with a metal oxide/hydroxide and then a phosphate ester, or phosphonate, or a salt thereof.

It is the object of the present invention to provide metal oxide coated flaky pigments having an effective protective layer. In particular, the protective layer shall provide effective protection against the photocatalytic activity of the pigment induced by ultraviolet rays without influencing the optical properties of the pigment. In addition, the pigments shall have excellent weathering stability and water resistance and suppress yellowing in thermoplastic polyolefins containing a phenolic anti-oxidant.

Said object has been solved by pearlescent pigments comprising a platelet-shaped substrate, a metal oxide coating comprising a metal oxide layer having a refractive index of greater than 1.8 and a protective layer, wherein the protective layer comprises a metal oxide/hydroxide layer and optionally boroxide, applied to which is an organic aftercoat of an acrylic copolymer, wherein the metal oxide/hydroxide of the protective layer is selected from oxides/hydroxides of silicon (silicon oxide, silicon oxide hydrate), aluminium, zirconium, magnesium, calcium, iron(III), yttrium, cerium, zinc and combinations thereof.

The protective layer provides a very good photo-stabilisation of the $TiO_2$ coated platelet-shaped substrates, such as mica, combined with a good water resistance and an anti-yellowing performance, making the product usable in high grade plastics (anti yellowing effect) as well as in high grade coating (automotive).

The pearlescent pigments of the present invention comprise a platelet-shaped substrate. The platelet-shaped substrate is coated with at least a metal oxide layer having a refractive index of greater than 1.8. The metal oxide coating comprising a metal oxide layer having a refractive index of greater than 1.8 is located between the platelet-shaped substrate and the protective layer. That is, the pearlescent pigment of the present invention is a metal oxide coated platelet-shaped substrate having on top of the metal oxide layer a protective layer. The protective layer comprises a metal oxide/hydroxide layer (of the protective layer) and optionally boroxide next to the metal oxide coating, applied to which is an organic aftercoat of an acrylic copolymer. The metal oxide coating can consist of one metal oxide layer, which may comprise two, or more different metal oxides; or of two, or more layers (so-called multilayer structure). The multilayer structure may comprise two, or more different metal oxides having a refractive index of greater than 1.8; or it may comprise alternating layers of metal oxides having a refractive index of greater than 1.8 and metal oxides having a refractive index of smaller than 1.8. A multilayer structure comprising a metal oxide having a refractive index of greater than 1.8, a metal oxide having a refractive index of smaller than 1.8 and a metal oxide having a refractive index of greater than 1.8 is preferred. Examples of such multilayer structures are $TiO_2/SiO_2/TiO_2$ and $Fe_2O_3/SiO_2/TiO_2$.

Preferably, the metal oxide layer of the metal oxide coating, on which the protective layer is applied, is a metal oxide having a refractive index of greater than 1.8, or a mixture of metal oxides having a refractive index of greater than 1.8. The composition of said metal oxide layer is different from the metal oxide/hydroxide layer of the protective layer.

Preferably, the network of the organic aftercoat of the acrylic copolymer does not comprise metal atoms, such as, for example, Si, Zr, Ti, or Al. Preferably, the acrylic copolymer of the present invention does not comprise inorganic functional groups, such as, for example, phosphate ester and phosphonate groups.

Suitable platelet-shaped substrates are transparent, partially reflectant, or reflectant. Examples thereof are natural micaceous iron oxide (for example as in WO 99/48634), synthetic and doped micaceous iron oxide (for example as in EP-A 0 068 311), mica (biotite, vermiculite, sericite, muscovite, phlogopite, fluorophlogopite, kaolinite or related, or any synthetic mica, such as synthetic fluorophlogopite), another layered silicate, basic lead carbonate, flaky barium sulfate, $MoS_2$, $SiO_2$, $Al_2O_3$, $TiO_2$, glass, perlite, ZnO, $ZrO_2$, $SnO_2$, BiOCl, chromium oxide, BN, MgO flakes, $Si_3N_4$, graphite, $SiO_z$, $SiO_2/SiO_x/SiO_2$ ($0.03 \leq x \leq 0.95$), $SiO_{1.40-2.0}/SiO_{0.70-0.99}/SiO_{1.40-2.0}$, and $Si/SiO_z$ with $0.70 \leq z \leq 2.0$, especially $1.40 \leq z \leq 2.0$.

Particularly preferred substrates are natural, or synthetic mica, $SiO_2$ flakes, $Al_2O_3$ flakes, $TiO_2$ flakes, and glass flakes.

Another preferred embodiment is the use of flat metallic particles as the core. Examples of suitable metallic particles are flakes of Ag, Al, Au, Cu, Cr, Fe, Ge, Mo, Ni, Si, Ti, or alloys thereof, such as brass or steel, preferably Al flakes. Depending on the material, a natural optically non-interfering oxide layer may form on the surface of metallic particle. Partially reflecting cores have preferably a reflectance of at least 35% of the light falling vertically on its surface in the range from 380 to 800 nm.

Additional examples of plateletlike substrates are platelet-like organic pigments, such as chinacridones, dioxazines, phthalocyanine, fluororubine, red perylenes, or diketopyr-rolo-pyrroles. Platelet-like particles coated with metal oxide layers and their use as effect pigments are generally known per se, for example from DE 14 67 468, EP 0 045 851, DE 32 37 264, DE 36 17 430, EP 0 298 604, EP 0 388 932 and EP 0 402 943.

Examples of a metal oxide coating having a refractive index of greater than 1.8 are zinc oxide (ZnO), zirconium oxide ($ZrO_2$), titanium dioxide ($TiO_2$), carbon, indium oxide ($In_2O_3$), indium tin oxide (ITO), tantalum pentoxide ($Ta_2O_5$), chromium oxide ($Cr_2O_3$), iron oxides such as iron(II)/iron (III) oxide ($Fe_3O_4$) and iron(III) oxide ($Fe_2O_3$), magnesium oxide (MgO), antimony trioxide ($Sb_2O_3$), silicon monoxides (SiO), selenium trioxide ($Se_2O_3$), tin oxide ($SnO_2$), tungsten trioxide ($WO_3$), or combinations thereof. It being possible for the metal oxide to be a single oxide or a mixture of oxides, with or without absorbing properties, for example, $TiO_2$, $ZrO_2$, $Fe_2O_3$, $Fe_3O_4$, $Cr_2O_3$ or ZnO, with $TiO_2$ being especially preferred.

Examples of a metal oxide coating having a refractive index of smaller than 1.8 are $Al_2O_3$ and $SiO_2$, or mixtures thereof.

The protective layer is suitable for the stabilisation of metal oxide-coated, especially titanium dioxide-coated platelet-shaped substrates. Examples thereof are pearlescent pigments (including those which react under the fluidized bed conditions to nitrides, oxynitrides or by reduction to suboxides etc.) (for example EP-A-9739066, EP-A-0948571, WO99/61529, EP-A-1028146, EP-A-0763573, U.S. Pat. No. 5,858,078, WO98/53012, WO97/43348, U.S. Pat. No.-B-6, 165,260, DE-A-1519116, WO97/46624, EP-A-0509352); pearlescent multilayer pigments (for example EP-A-0948572, EP-A-0882099, U.S. Pat. Nos. 5,958,125, 6,139, 613), especially metal oxide-coated mica platelets which are commercially available unter the names Iriodin® (E. Merck, Darmstadt), Phoenix® (Eckart, Fürth), Mearlin® (Mead Corporation, New York/USA) and Infinite Color® (Shisheido, Japan), and coated metal flakes, such as, for example, titanium dioxide coated metal flakes. The size of the core particles is not critical per se and can be adapted to the particular use. Generally, the particles have a length from about 1 to 200 µm, in particular from about 5 to 100 µm, and thicknesses from about 0.05 to 5 µm, preferably from 0.1 to 2 µm. Particles having a platelet-like shape are understood to be such having two essentially flat and parallel surfaces, with an aspect ratio length to thickness of from about 2:1 to about 1000:1, and a length to width ratio of from 3:1 to 1:1.

Preferred are platelet-like particles on basis of a transparent substrate having a low index of refraction, especially natural, or synthetic mica, another layered silicate, glass, perlite, $Al_2O_3$, $SiO_z$, especially $SiO_2$, $SiO_2/SiO_x/SiO_2$ ($0.03 \leq x \leq 0.95$), $SiO_{1.40-2.0}/SiO_{0.70-0.99}/SiO_{1.40-2.0}$, or $Si/SiO_z$ with $0.70 \leq z \leq 2.0$, especially $1.40 \leq z \leq 2.0$, having on top of the substrate a titanium oxide layer. It is possible to obtain pigments that are more intense in colour and more transparent by applying, on top of the $TiO_2$ layer, a metal oxide of low refractive index, such as $SiO_2$, $Al_2O_3$, AlOOH, $B_2O_3$ or a mixture thereof, preferably $SiO_2$, and applying a further $TiO_2$ layer on top of the latter layer (EP-A-892832, EP-A-753545, WO93/08237, WO98/53011, WO9812266, WO9838254, WO99/20695, WO00/42111, and EP-A-1213330). The outermost titanium oxide layer can be stabilised by the protective layer of the present invention.

Pigments having the following layer structure are especially preferred:

| TRASUB | $TiO_2$ | | |
|---|---|---|---|
| TRASUB | $TiO_2/Fe_2O_3$ | | |
| TRASUB | $Fe_2TiO_5$ | | |
| TRASUB | $TiO_2$ | $SiO_2$ | $TiO_2$ |
| TRASUB | $TiO_2$ | $SiO_2$ | $TiO_2/Fe_2O_3$ |
| TRASUB | $(Sn,Sb)O_2$ | $SiO_2$ | $TiO_2$ |
| TRASUB | $TiO_2/Fe_2O_3$ | $SiO_2$ | $TiO_2/Fe_2O_3$ |
| TRASUB | $Cr_2O_3$ | $SiO_2$ | $TiO_2$ |
| TRASUB | $Fe_2O_3$ | $SiO_2$ | $TiO_2$ |
| TRASUB | TiO suboxides | $SiO_2$ | TiO suboxides |
| TRASUB | $TiO_2$ | $SiO_2$ | $TiO_2 + SiO_2 + TiO_2$ |
| TRASUB | $TiO_2 + SiO_2 + TiO_2$ | $SiO_2$ | $TiO_2 + SiO_2 + TiO_2$ |
| TRASUB | $TiO_2$ | $Al_2O_3$ | $TiO_2$ |
| TRASUB | $Fe_2TiO_5$ | $SiO_2$ | $TiO_2$ |
| TRASUB | $TiO_2$ | $SiO_2$ | $Fe_2TiO_5/TiO_2$ |
| TRASUB | STL | $TiO_2$ | | wherein TRASUB is a transparent, or semitransparent substrate having a low index of refraction, especially natural, or synthetic mica, another layered silicate, glass, perlite, $Al_2O_3$, $SiO_z$, especially $SiO_2$, $SiO_2/SiO_x/SiO_2$ ($0.03 \leq x \leq 0.95$), $SiO_{1.40-2.0}/SiO_{0.70-0.99}/SiO_{1.40-2.0}$, or $Si/SiO_z$ with $0.70 \leq z \leq 2.0$, especially $1.40 \leq z \leq 2.0$, and STL is a semi-transparent layer, such as, for example, a semi-transparent metal layer of Cu, Ag, Cr, or Sn, or a semi-transparent carbon layer.

As the metal oxide coated platelet-shaped substrate provided inventively with the protective layer it is preferred to use the following substrates: $TiO_2$ and/or iron oxide coated synthetic, or natural mica flakes, $TiO_2$ and/or iron oxide coated glass flakes, $TiO_2$ and/or iron oxide coated alumina flakes, $TiO_2$ and/or iron oxide coated $SiO_2$ flakes, $TiO_2$ and/or iron oxide coated perlite flakes, and mixtures thereof.

The metal oxide/hydroxide of the protective layer is preferably selected from oxides/hydroxides of silicon (silicon oxide, silicon oxide hydrate), aluminium, zirconium, magnesium, calcium, iron(III), yttrium, cerium, zinc and combinations thereof.

The metal oxide/hydroxide is present in an amount of from 0.1 to 10% by weight, preferably 0.8 to 4% by weight based on the weight of the pigment.

Optionally, boron oxide can be present in the metal oxide/hydroxide layer of the protective layer in an amount of from 0.1 to 14% by weight, preferably 0.2 to 3.4% by weight based on the weight of the pigment.

In a preferred embodiment of the present invention the metal oxide/hydroxide is an oxide/hydroxide of aluminium (aluminum oxide, aluminum oxide hydrate), zirconium ((hydrated) zirconium dioxide), or a mixture thereof. Aluminium oxides/hydroxides are preferred for coloristics and stabilisation; zirconium oxides/hydroxides are preferred for stabilisation and the best is their combination for stabilisation and coloristics.

Ternary mixtures of zirconium oxide, aluminum oxide and zinc oxide, or zirconium oxide, aluminum oxide and magnesium oxide show also excellent results.

In another preferred embodiment of the present invention the protective layer comprises 3 to 5% by weight aluminium oxide with 0.5 to 1.5% by weight boron oxide and about 5% by weight of the acrylic copolymer, each based on the weight of the pigment.

If used in combination, the metal oxide/hydroxide layer can be prepared by adding the two, or more salts of the corresponding (metal) oxides/hydroxides simultaneously or sequentially.

After application of the metal oxide/hydroxide layer the pigments may be isolated and calcinated at a temperature of from 250-900° C., especially of from 600-900° C. and then be coated with the acrylic copolymer. Alternatively, the acrylic copolymer is directly coated onto the metal oxide/hydroxide layer without isolation of the pigments coated with the metal oxide/hydroxide layer. Isolation and calcination (preferably at a temperature of 250 to 350° C.) is preferred, if boron oxide is present in the metal oxide/hydroxide layer. The pigments coated with the acrylic copolymer are isolated and usually dried at a temperature of 60 to 150° C.

In addition, to the metal oxide/hydroxide the protective layer comprises an acrylic copolymer. The acrylic copolymer has preferably groups with affinity for the pigment.

Examples of pigment affinity groups are —COOH, —COOR', —CONHR', —CONH$_2$, —OH, —SH, —NH$_2$, —NHR', —NR'$_2$, —SO$_3$H, —SO$_3$R', —N(phthalimide), —NHCOOR', —NHCONH$_2$, —NHCONHR', —CN, or (aromatic) heterocyclic groups containing one, or more nitrogen atoms, such as, for example, pyridinyl; pyrimidinyl, piperidinyl, piperazinyl, piperidonyl, carbazolyl, imidazolyl, pyrrolyl, vinylpyrazolyl, pyrrolidonyl, pyrrolidonyl, pyrrolidinyl, pyrrolidinyl, morpholinyl, oxolanyl, furanyl, thiophenyl, thiolanyl, triazolyl, and hydrogenated vinylthiazolyl, vinyl-oxazolyl and hydrogenated vinyloxazolyl. The radicals R' of said groups are straight-chain or branched alkyl radicals, aralkyl radicals, or aryl radicals, which may also be further substituted, by $C_1$-$C_{40}$alkyl radicals or by $C_6$-$C_{14}$ aryl radicals, for example. The following radicals are particularly preferred: $C_1$-$C_{40}$alkyl, examples being methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl, n-dodecyl, n-hexadecyl, and n-eicosyl; $C_6$-$C_{14}$aryl, examples being phenyl, 1-naphthyl, 2-naphthyl, 1-anthracenyl, 2-anthracenyl, and 9-anthracenyl, $C_7$-$C_{13}$aralkyl, preferably $C_7$-$C_{12}$phenylalkyl such as benzyl, 1-phenethyl, 2-phenethyl, 1-phenylpropyl, 2-phenylpropyl, 3-phenylpropyl, neophyl(1-methyl-1-phenylethyl), 1-phenylbutyl, 2-phenylbutyl, 3-phenylbutyl, and 4-phenylbutyl.

The groups with affinity for the pigment containing nitrogen atoms are preferred. Even more preferred the groups with affinity for the pigment are amino groups (NH$_2$, —NHR', —NR'$_2$), or (aromatic) heterocyclic groups containing one, or more nitrogen atoms, such as, for example, pyridinyl; or imidazolyl. Such copolymers are, for example, described in EP0311157.

The acrylic copolymer comprises preferably groups derived from alkyl esters of acrylic or methacrylic acid, such as, for example, alkyl or hydroxyl alkyl esters of acrylic or methacrylic acid; and (poly)alkyleneglycolmono(meth)acrylates.

In a preferred embodiment of the present invention the acrylic copolymer is an acrylic copolymer described in WO04/045755.

The copolymer of WO04/045755 comprises as copolymerized units the following monomers (A) an ethylenically unsaturated monomer containing at least one amino group;

(B) an ethylenically unsaturated monomer containing no amino group;
(C) optionally a hydroxy- or alkoxyalkyl(meth)acrylate of the formula $$CH_2=CH(R^1)-COO-C_tH_{2t}-OR^2$$

(D) a (poly)alkyleneglycolmono(meth)acrylate of the formula $$CH_2=CH(R^1)-COO-(C_mH_{2m}O)_n-OR^2$$

wherein $R^1$ is hydrogen or methyl and $R^2$ is hydrogen or $C_1$-$C_6$alkyl, t is an integer of 2, 3, 4, 5 or 6, and m is an integer of 2 or 3 and n is an integer of 2 to 20.

The copolymers described in Examples 1, 2, 4 and 5 of WO04/045755 can advantageously be used according to the present invention. Said copolymers can be used in admixture with a mono-$C_1$-$C_{20}$-alkylpolyethermonomaleate acid.

In a particularly preferred embodiment of the present invention the acrylic copolymer is an acrylic block copolymer. Acrylic block copolymers are, for example, described in WO06/074969.

The block copolymers described in WO06/074969 are obtainable by a process comprising the steps:
a1) polymerizing in a first step one or more ethylenically unsaturated monomers in the presence of at least one nitroxylether having the structural element

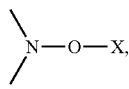

wherein X represents a group having at least one carbon atom and is such that the free radical X. derived from X is capable of initiating polymerization; or
a2) polymerizing in a first step one or more ethylenically unsaturated monomers in the presence of at least one stable free nitroxyl radical

and a free radical initiator;
wherein at least one monomer used in the steps a1) or a2) is a $C_1$-$C_6$alkyl or hydroxy $C_1$-$C_6$ alkyl ester of acrylic or methacrylic acid; and a second step b) comprising the modification of the polymer or copolymer prepared under a1) or a2) by a transesterification reaction, an amidation, hydrolysis or anhydride modification or a combination thereof.

The block copolymers described in Examples A3

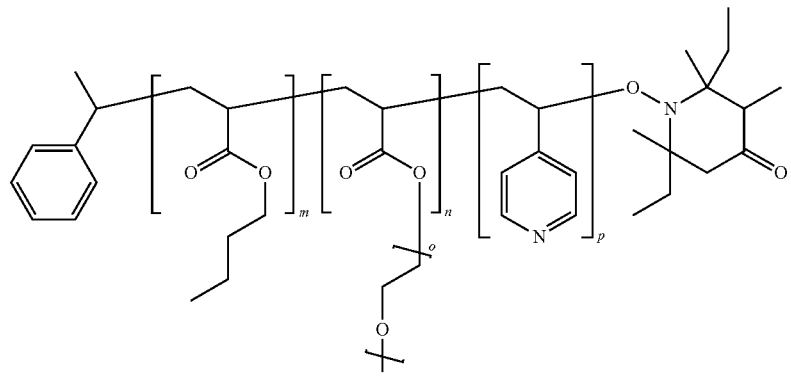

(Mn=17500 g/mol, PDI=1.6, OH-value=0.05 meq/g), A6, A11 and A15 of WO06/074969 can advantageously be used according to the present invention.

In addition, the present invention relates to a process for producing the pigment of the present invention, characterized in that
(a) a flaky (pearl pigment) is suspended in water, the pH of the suspension is adjusted to about 3, then an aqueous solution of one or more (metal) salts selected from boron, silicon, aluminium, zinc, calcium, magnesium, zirconium, iron (III), yttrium and cerium is added to the suspension while keeping its pH constant with an aqueous alkali solution, and after addition, its pH is adjusted to about 7 to 8.5, and
(b) a solution of the acrylic copolymer is added to the resulting suspension under stirring, and after addition, the suspension is filtered, washed with water and dried.

These (hydrated) metal oxides can be coated on the flaky (pearl) pigment by subjecting aqueous solutions of their corresponding metal salts such as chlorides, sulfates, nitrates, halides and oxy halides as the starting materials to alkali hydrolysis.

The amount of the metal salt forming the hydrated metal oxide used in the present invention suffices insofar it can form a monolayer of the hydrated metal oxide on the surface of the flaky pigment. Accordingly, if the specific surface area of the flaky pearl pigment is large, a large amount of the metal salt is necessary, whereas for a small specific surface area, a small amount suffices. Further, a large amount of the metal salt is unpreferable because this causes the change of in the color tone (hue, chroma, luster) of the flaky pearl pigment and further agglomeration of pigment particles occurs easily. Usually, the amount of the metal salt can be varied depending on the specific surface area of the flaky pearl pigment, and this amount can be determined in the range of 0.1 to 10% by weight relative to the flaky pearl pigment.

The complete process is conducted at a temperature between 10 and 90° C., preferably at a temperature between 60 and 90° C.

Aluminium is the preferred for coloristics and stabilisation; zirconium for stabilisation and the best is their combination for stabilisation and coloristics.

Preferred precursors of aluminium oxide, or hydroxide are the chloride, nitrate or sulphate of aluminium. Preferred precursors of zirconium oxide, or hydroxide are the oxychloride, nitrate or sulfate of zirconium. In combination the two salts can be added simultaneously or sequentially.

The optimum pH is pH 3 which is changed after the addition of the metal salt to pH 7 or more.

The acrylic copolymer is added after the pH change at pH 7 to pH 8.5.

Now, the process for producing the pigment according to the present invention is described in more detail.

First, an aqueous suspension of the flaky (pearl) pigment is prepared, and the pH of the suspension is adjusted using an acidic aqueous solution or an alkaline aqueous solution to a predetermined pH value of about 3. The pH value for this hydrolysis is varied depending on the type of a (metal) salt used in the present invention. To the suspension under stirring is added a separately prepared solution of the salt, during of which the pH in the suspension is kept constant. The pH is changed after the addition from pH 3 to neutral.

The solution of the acrylic copolymer is added dropwise to the product obtained in step a). During this coating treatment, the solution is adjusted to pH and temperature which are suitable for each material to be handled, and each material is stirred so that the pigment is uniformly coated therewith. After the coating treatment, the pigment is filtered, washed with water and dried in a usual manner, such as, for example, dried in an oven at temperatures between 100° C. and 150° C., to give the desired pigment.

The (effect) pigments according to the invention can be used for all customary purposes, for example for colouring polymers in the mass, coatings (including effect finishes, including those for the automotive sector) and printing inks (including offset printing, intaglio printing, bronzing and flexographic printing), and also, for example, for applications in cosmetics, in ink-jet printing, for dyeing textiles, glazes for ceramics and glass as well as laser marking of papers and plastics. Such applications are known from reference works, for example "Industrielle Organische Pigmente" (W. Herbst and K. Hunger, VCH Verlagsgesellschaft mbH, Weinheim/New York, 2nd, completely revised edition, 1995).

When the pigments according to the invention are interference pigments (effect pigments), they are goniochromatic and result in brilliant, highly saturated (lustrous) colours. They are accordingly very especially suitable for combination with conventional, transparent pigments, for example organic pigments such as, for example, diketopyrrolopyrroles, quinacridones, dioxazines, perylenes, isoindolinones etc., it being possible for the transparent pigment to have a similar colour to the effect pigment. Especially interesting combination effects are obtained, however, in analogy to, for example, EP-A-388 932 or EP-A-402 943, when the colour of the transparent pigment and that of the effect pigment are complementary.

The pigments according to the invention can be used with excellent results for pigmenting high molecular weight organic material.

The high molecular weight organic material for the pigmenting of which the pigments or pigment compositions according to the invention may be used may be of natural or synthetic origin. High molecular weight organic materials usually have molecular weights of about from $10^3$ to $10^8$ g/mol or even more. They may be, for example, natural resins, drying oils, rubber or casein, or natural substances derived therefrom, such as chlorinated rubber, oil-modified alkyd resins, viscose, cellulose ethers or esters, such as ethylcellulose, cellulose acetate, cellulose propionate, cellulose acetobutyrate or nitrocellulose, but especially totally synthetic organic polymers (thermosetting plastics and thermoplastics), as are obtained by polymerisation, polycondensation or polyaddition. From the class of the polymerisation resins there may be mentioned, especially, polyolefins, such as polyethylene, polypropylene or polyisobutylene, and also substituted polyolefins, such as polymerisation products of vinyl chloride, vinyl acetate, styrene, acrylonitrile, acrylic acid esters, methacrylic acid esters or butadiene, and also copolymerisation products of the said monomers, such as especially ABS or EVA.

From the series of the polyaddition resins and polycondensation resins there may be mentioned, for example, condensation products of formaldehyde with phenols, so-called phenoplasts, and condensation products of formaldehyde with urea, thiourea or melamine, so-called aminoplasts, and the polyesters used as surface-coating resins, either saturated, such as alkyd resins, or unsaturated, such as maleate resins; also linear polyesters and polyamides, polyurethanes or silicones.

The said high molecular weight compounds may be present singly or in mixtures, in the form of plastic masses or melts. They may also be present in the form of their monomers or in the polymerised state in dissolved form as filmformers or binders for coatings or printing inks, such as, for example, boiled linseed oil, nitrocellulose, alkyd resins, melamine resins and urea-formaldehyde resins or acrylic resins.

Depending on the intended purpose, it has proved advantageous to use the effect pigments or effect pigment compositions according to the invention as toners or in the form of preparations. Depending on the conditioning method or intended application, it may be advantageous to add certain amounts of texture-improving agents to the effect pigment before or after the conditioning process, provided that this has no adverse effect on use of the effect pigments for colouring high molecular weight organic materials, especially polyethylene. Suitable agents are, especially, fatty acids containing at least 18 carbon atoms, for example stearic or behenic acid, or amides or metal salts thereof, especially magnesium salts, and also plasticisers, waxes, resin acids, such as abietic acid, rosin soap, alkylphenols or aliphatic alcohols, such as stearyl alcohol, or aliphatic 1,2-dihydroxy compounds containing from 8 to 22 carbon atoms, such as 1,2-dodecanediol, and also modified colophonium maleate resins or fumaric acid colophonium resins. The texture-improving agents are added in amounts of preferably from 0.1 to 30% by weight, especially from 2 to 15% by weight, based on the end product.

The (effect) pigments according to the invention can be added in any tinctorially effective amount to the high molecular weight organic material being pigmented. A pigmented substance composition comprising a high molecular weight organic material and from 0.01 to 80% by weight, preferably from 0.1 to 30% by weight, based on the high molecular weight organic material, of an pigment according to the invention is advantageous. Concentrations of from 1 to 20% by weight, especially of about 10% by weight, can often be used in practice.

High concentrations, for example those above 30% by weight, are usually in the form of concentrates ("masterbatches") which can be used as colorants for producing pigmented materials having a relatively low pigment content, the pigments according to the invention having an extraordinarily low viscosity in customary formulations so that they can still be processed well.

For the purpose of pigmenting organic materials, the effect pigments according to the invention may be used singly. It is, however, also possible, in order to achieve different hues or colour effects, to add any desired amounts of other colour-imparting constituents, such as white, coloured, black or effect pigments, to the high molecular weight organic substances in addition to the effect pigments according to the invention. When coloured pigments are used in admixture with the effect pigments according to the invention, the total amount is preferably from 0.1 to 10% by weight, based on the high molecular weight organic material. Especially high goniochromicity is provided by the preferred combination of an effect pigment according to the invention with a coloured pigment of another colour, especially of a complementary colour, with colorations made using the effect pigment and colorations made using the coloured pigment having, at a measurement angle of 10°, a difference in hue ($\Delta H^*$) of from 20 to 340, especially from 150 to 210.

Preferably, the effect pigments according to the invention are combined with transparent coloured pigments, it being possible for the transparent coloured pigments to be present either in the same medium as the effect pigments according to the invention or in a neighbouring medium. An example of an arrangement in which the effect pigment and the coloured pigment are advantageously present in neighbouring media is a multi-layer effect coating.

The pigmenting of high molecular weight organic substances with the pigments according to the invention is carried out, for example, by admixing such a pigment, where appropriate in the form of a masterbatch, with the substrates using roll mills or mixing or grinding apparatuses. The pigmented material is then brought into the desired final form using methods known per se, such as calendering, compression moulding, extrusion, coating, pouring or injection moulding. Any additives customary in the plastics industry, such as plasticisers, fillers or stabilisers, can be added to the polymer, in customary amounts, before or after incorporation of the pigment. In particular, in order to produce non-rigid shaped articles or to reduce their brittleness, it is desirable to add plasticisers, for example esters of phosphoric acid, phthalic acid or sebacic acid, to the high molecular weight compounds prior to shaping.

For pigmenting coatings and printing inks, the high molecular weight organic materials and the effect pigments according to the invention, where appropriate together with customary additives such as, for example, fillers, other pigments, siccatives or plasticisers, are finely dispersed or dissolved in the same organic solvent or solvent mixture, it being possible for the individual components to be dissolved or dispersed separately or for a number of components to be dissolved or dispersed together, and only thereafter for all the components to be brought together.

Dispersing an effect pigment according to the invention in the high molecular weight organic material being pigmented, and processing a pigment composition according to the invention, are preferably carried out subject to conditions under which only relatively weak shear forces occur so that the effect pigment is not broken up into smaller portions.

Plastics comprising the pigment of the invention in amounts of 0.1 to 50% by weight, in particular 0.5 to 7% by weight. In the coating sector, the pigments of the invention are employed in amounts of 0.1 to 10% by weight. In the pigmentation of binder systems, for example for paints and printing inks for intaglio, offset or screen printing, the pigment is incorporated into the printing ink in amounts of 0.1 to 50% by weight, preferably 5 to 30% by weight and in particular 8 to 15% by weight.

The colorations obtained, for example in plastics, coatings or printing inks, especially in coatings or printing inks, more especially in coatings, are distinguished by excellent properties, especially by extremely high saturation, outstanding fastness properties, high color purity and high goniochromicity.

When the high molecular weight material being pigmented is a coating, it is especially a speciality coating, very especially an automotive finish.

The effect pigments according to the invention are also suitable for making-up the lips or the skin and for colouring the hair or the nails.

The invention accordingly relates also to a cosmetic preparation or formulation comprising from 0.0001 to 90% by weight of a pigment, especially an effect pigment, according to the invention and from 10 to 99.9999% of a cosmetically suitable carrier material, based on the total weight of the cosmetic preparation or formulation.

Such cosmetic preparations or formulations are, for example, lipsticks, blushers, foundations, nail varnishes and hair shampoos.

The pigments may be used singly or in the form of mixtures. It is, in addition, possible to use pigments according to the invention together with other pigments and/or colorants, for example in combinations as described hereinbefore or as known in cosmetic preparations.

The cosmetic preparations and formulations according to the invention preferably contain the pigment according to the invention in an amount from 0.005 to 50% by weight, based on the total weight of the preparation.

Suitable carrier materials for the cosmetic preparations and formulations according to the invention include the customary materials used in such compositions.

The cosmetic preparations and formulations according to the invention are prepared in conventional manner, for example by mixing or stirring the components together, optionally with heating so that the mixtures melt.

Various features and aspects of the present invention are illustrated further in the examples that follow. While these examples are presented to show one skilled in the art how to operate within the scope of this invention, they are not to serve as a limitation on the scope of the invention where such scope is only defined in the claims. Unless otherwise indicated in the following examples and elsewhere in the specification and claims, all parts and percentages are by weight, temperatures are in degrees centigrade and pressures are at or near atmospheric.

EXAMPLES

Example 1

20 g $TiO_2$ coated mica—CIBA XYMARA™ Silver Pearl S19 (ex CIBA SC)— are dispersed in 200 ml water. The suspension is heated to 75° C. A solution of 1.05 g $AlCl_3$ dissolved in 200 ml water is added at 4 ml/min with a dosing pump. The suspension is maintained at pH 3 by compensation of the pH with the solution of NaOH (at 1%). The suspension is kept for 30 min at pH 3. Then the pH of the suspension is pushed at pH 7 with the 1% NaOH solution. The suspension is kept for 30 min at pH 7. A solution of 1 g of the copolymer obtained in Example 3A of WO06/074969

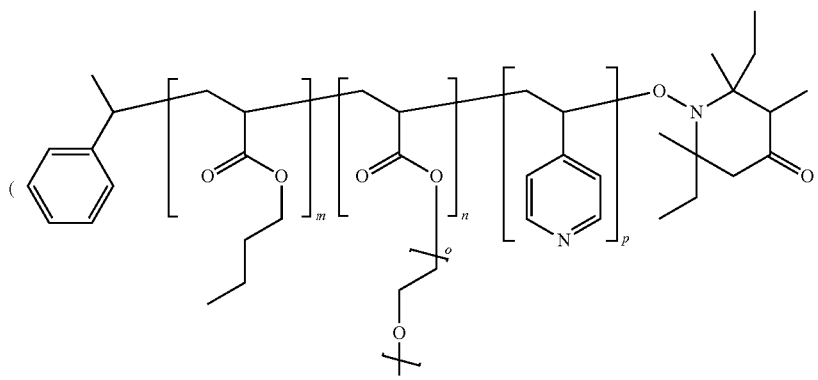

(Mn=17500 g/mol, PDI=1.6, OH-value=0.05 meq/g; 50% active)) dissolved in 50 ml water is added. The suspension is then kept for 30 min at pH 7. The suspension is filtrated; the pigment is recovered, washed with water and dried overnight at 90° C. in an oven.

Comparative Example 1

Example 1 is repeated, except that no $Al_2O_3$ is deposited.

Comparative Example 2

Example 1 is repeated, except that no copolymer is deposited.

Example 2

20 g $TiO_2$ coated mica—CIBA XYMARA™ Silver Pearl S19 (ex CIBA SC)— are dispersed in 200 ml water. The suspension is heated to 75° C. A solution of 1.05 g $AlCl_3$ dissolved in 200 ml water is added at 4 ml/min with a dosing pump. The suspension is maintained at pH 3 by compensation of the pH with the solution of NaOH (at 1%). The suspension is kept for 30 min at pH3. Then the pH of the suspension is pushed at pH 7 with the 1% NaOH solution. The suspension is kept for 30 min at pH7. A solution of 1.25 g CIBA EFKA 4590 (40% active) dissolved in 50 ml water is added. The suspension is then kept for 30 min at pH 7. The suspension is filtrated; the pigment is recovered, washed with water and dried overnight at 90° C. in an oven.

Example 3

50 g $TiO_2$ coated mica—CIBA XYMARA™ Silver Pearl S03 (ex CIBA SC)— are dispersed in 500 ml water. The suspension is heated to 75° C. A solution of 5.76 g $ZrOCl_2.8H_2O$ dissolved in 290 ml water is added at 4 ml/min with a dosing pump. The suspension is maintained at pH 3 by compensation of the pH with the solution of NaOH (at 1%). The suspension is kept for 30 min at pH 3. Then the pH of the suspension was pushed at pH 7 with the 1% NaOH solution. The suspension is kept for 30 min at pH 7. A solution of 5 g of the copolymer obtained in Example 3A of WO06/074969

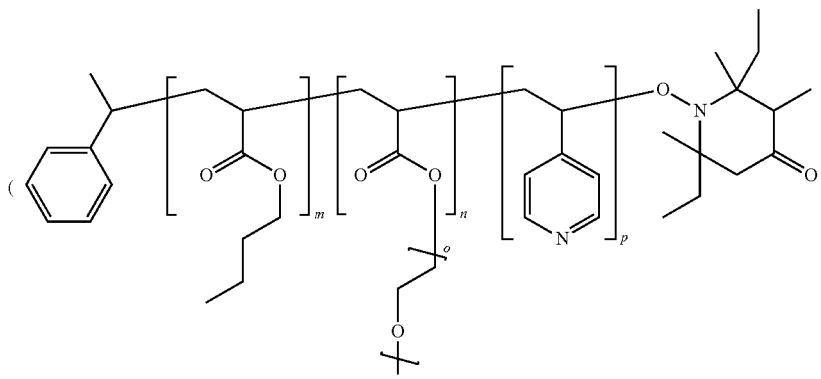

(Mn=17500 g/mol, PDI=1.6, OH-value=0.05 meq/g; 50% active)) dissolved in 100 ml water is added. The suspension is then kept for 30 min at pH 7. The suspension is filtrated; the pigment is recovered, washed with water and dried overnight at 90° C. in an oven.

Example 4

50 g TiO$_2$ coated mica—XYMARA™ Silver Pearl S23 (ex CIBA SC)— are dispersed in 500 ml water. The suspension is heated to 75° C. A solution of 0.98 g AlCl$_3$ dissolved in 200 ml water is added at 4 ml/min with a dosing pump. The suspension is maintained at pH 3 by compensation of the pH with the solution of NaOH (at 1%). The suspension is kept for 30 min at pH 3. A solution of 2.88 g ZrOCl$_2$.8H$_2$O dissolved in 300 ml water is added at 4 ml/min with a dosing pump (within 1.2 h, the pH of the suspension being maintained at 3 by compensation with the solution of NaOH (at 1%)). The suspension is kept again for 30 min at pH 3. Then the pH of the suspension is pushed at pH 7 with the 1% NaOH solution. The suspension is kept for 30 min at pH 7. A solution of 5 g of the copolymer obtained in Example 3A of WO06/074969

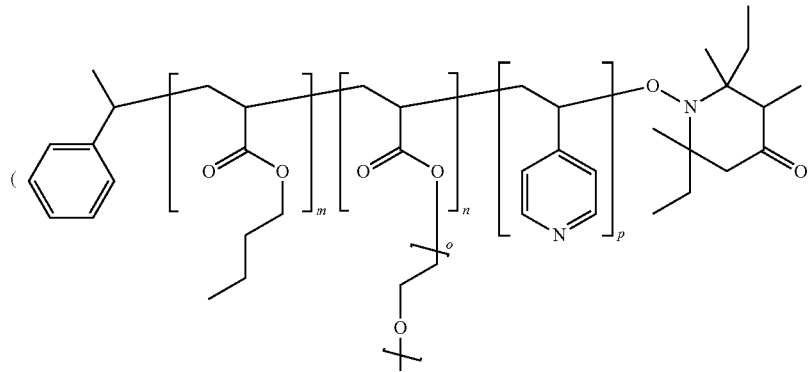

(Mn=17500 g/mol, PDI=1.6, OH-value=0.05 meq/g; 50% active)) dissolved in 100 ml water is added. The suspension is then kept for 30 min at pH 7. The suspension is filtrated; the pigment is recovered, washed with water and dried overnight at 90° C. in an oven.

Example 5

20 g TiO$_2$ coated mica—CIBA XYMARA™ Silver Pearl S19 (ex CIBA SC)— are dispersed in 200 ml water. The suspension is heated to 75° C. The pH of the suspension is reduced to a value of 3 with a solution of HCL (3.5%). A solution of 1.05 g AlCl$_3$ dissolved in 200 ml water is added at 4 ml/min with a dosing pump. The suspension is maintained at pH 3 by compensation of the pH with the solution of NaOH (at 1%). The suspension is kept for 30 min at pH 3. Then the pH of the suspension is pushed at pH 7 with the 1% NaOH solution. The suspension is kept for 10 min at pH 7. A solution of 0.3 g Na$_2$B$_4$O$_7$ in 5 ml water (at 80° C.) is added. After 10 min at 75° C. and pH 7 the suspension is cooled down. The suspension is filtrated; the pigment is recovered and dried at 300° C. in an oven. The powder (21 g) is dispersed in 200 ml water under vigorous stirring. A solution of 1.1 g of the copolymer obtained in Example 3A of WO06/074969

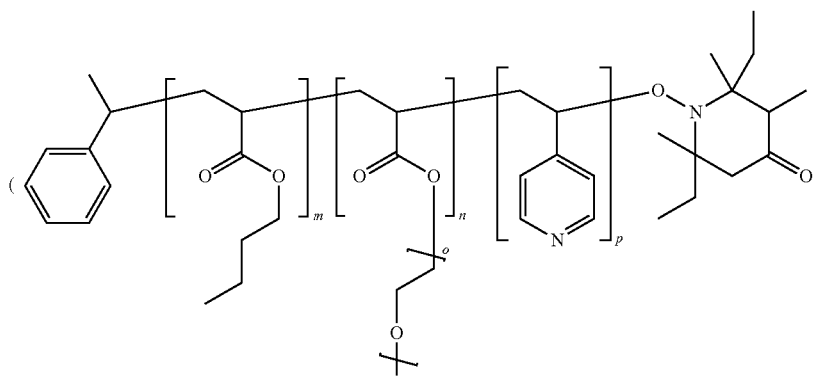

(Mn=17500 g/mol, PDI=1.6, OH-value=0.05 meq/g; 50% active)) dissolved in 50 ml water is added. The suspension is then kept for 30 min at pH7. The suspension is filtrated, the pigment is recovered, washed with water and dried overnight at 90° C. in an oven.

Similar products are obtained, if instead of the copolymer obtained in Example 3A of WO06/074969 the copolymers obtained in Examples A6, A11 and A15 of WO06/074969 are used.

Example A6: Synthesis of block copolymer Poly(n-BA-MPEGA-b-4-VP); Mn=8829, PDI=1.36; the degree of polymerization is: P[(nBA-MPEGA)-b-4VP]=(23-12)-b-14.

Example A11: Synthesis of a non-polar block copolymer Poly[(n-BA-iC12-15A)-b-4VP]; _Mn=12216, PDI=1.27; the degree of polymerization is: P[(nBA-iC12-15A)-b-4VP]=(16-60)-b-14.

Example A15: a non-polar block copolymer Poly[(n-BA-BhA)-b-DMAPMA; Mn=10652, PDI=1.60; degree of polymerization is: P[(nBA-BhA)-b-S=(20-55)-b-23.

Methylene Blue Test

The photocatalytic activity of the samples is evaluated by photo-degradation of methylene blue: 50 mg of effect pigment in 5 g water are stirred by a magnetic stirrer in the presence of 1 drop of methylene blue solution and exposed to light. A comparison sample is prepared and agitated at the same time under light exclusion. Colour changes of the samples are evaluated each half hour (4×) with regard to the comparison sample.

Anti Yellowing Test

Determination of the yellow index was performed by incorporating the titanium dioxide-coated mica in high density polyethylene (HDPE) step chips with an antioxidant, butylated hydroxytoluene (BHT), and exposing the step chips to UV light in a QUV meter. The yellowing which occurred was monitored by obtaining the Yellow Index as measured on a Hunter LabScan meter.

Water Soaking Test

Millbase:

| Product | % by wt. |
|---|---|
| 1-Butanol | 4.00 |
| Baysilone MA | 0.035 |
| Buylglycolacetate | 4.00 |
| Setal 84XX-70 | 42.93 |

-continued

| Product | % by wt. |
|---|---|
| Setamine US138BB70 | 16.66 |
| Solvesso 100 | 32.36 |
| Sum | 99.99 |

Let Down:

| Product | % by wt. |
|---|---|
| 1-Butanol | 5.14 |
| Baysilone MA | 0.045 |
| Buylglycolacetate | 2.57 |
| Setal 84XX-70 | 55.06 |
| Setamine US138BB70 | 21.39 |
| Solvesso 100 | 15.79 |
| Sum | 100.00 |

Millbase and Let Down are mixed well in a ratio of 30:70. 0.2 g of the titanium dioxide-coated mica and 9.8 g of the blend are continuously stirred on a magnet stirrer. The resin/pigment dispersion is drawn down onto a Leneta black and white chart (panel) from the Leneta Company using a wet film applicator. The film is flashed in a flash cabinet for 30 minutes and then "baked" in an oven at 130° C. for 30 minutes.

Before water soak all initial values for color, gloss, haze and DOI are measured.

The panels are used in landscape format. On their reverse a line is drawn 5 cm from the bottom side of the panels, this side will be under water.

The test is implemented at 2 different conditions:
1. 60° C. for 16 h
2. 80° C. for 8 h The panels are placed into the panel holder in the aluminium pot. The pot is then filled with demineralised water up to the line drawn on the panels (5 cm deep); fresh water is used for every test. The pot is closed and the thermostat placed through the hole in the lid into the water and set for either 60° C. or 80° C. Once the temperature is reached, the time is taken.

After completion of the test cycle the equipment is switched off and the panels are removed from the water bath. Water drops are wiped off the panels and the panels are kept for 2 h at room temperature before measuring color, gloss, haze and DOI on the soaked side.

Test results for selected products are shown in the table below:

| Product of | Methylene Blue Test[1] | Water Soaking Test[1] |
|---|---|---|
| Example 1 | 5 | 5 |
| Comparative Example 1 | 1 | 2-3 |
| Comparative Example 2 | 4 | 3-4 |
| Example 2 | 5 | 4-5 |
| Example 3 | 5 | 4 |
| Example 4 | 5 | 4 |
| Example 5 | 5 | 5 |

[1] Quality is evaluated using a ranking 1 (bad performance) to 5 (excellent performance).

As evident from the table the product of Example 1 shows superior performance in comparison to the products of Comparative Example 1 and 2, which do not contain a metal oxide and acrylic copolymer coating, respectively in the Methylene Blue Test as well as in the Water Soaking Test.

The invention claimed is:

1. A pearlescent pigment comprising a platelet-shaped substrate, a metal oxide coating comprising:
   a metal oxide layer having a refractive index of greater than 1.8; and
   a protective layer,
   wherein the protective layer comprises a metal oxide/hydroxide layer and optionally boroxide, applied to which is an organic aftercoat of an acrylic copolymer,
   wherein the metal oxide/hydroxide of the protective layer is selected from oxides/hydroxides of silicon (silicon oxide, silicon oxide hydrate), aluminium, zirconium, magnesium, calcium, iron(III), yttrium, cerium, zinc and combinations thereof, and
   wherein the acrylic copolymer comprises as copolymerized units the following monomers
   (A) an ethylenically unsaturated monomer containing at least one amino group;
   (B) an ethylenically unsaturated monomer containing no amino group;
   (C) optionally a hydroxy- or alkoxyalkyl(meth)acrylate of the formula

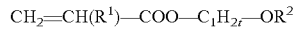

(D) a (poly)alkyleneglycolmono(meth)acrylate of the formula

wherein $R^1$ is hydrogen or methyl and $R^2$ is hydrogen or $C_1$-$C_6$alkyl, t is an integer of 2, 3, 4, 5 or 6; and m is an integer of 2 or 3 and n is an intekger of 2 to 20.

2. The pearlescent pigment according to claim 1, wherein the metal oxide/hydroxide content (protective layer) of the pigment is in the range of from 0.1 to 10% by weight, based on the total weight of the pigment.

3. The pearlescent pigment according to claim 1, wherein the acrylic copolymer content of the pigment is in the range of from 0.1 to 10% by weight, based on the total weight of the pigment.

4. The pearlescent pigment according to claim 1, wherein the platelet-shaped substrate is selected from natural micaceous iron oxide, synthetic and doped micaceous iron oxide, natural, and synthetic mica, another layered silicate, basic lead carbonate, flaky barium sulfate, $MoS_2$, $SiO_2$, $Al_2O_3$, $TiO_2$, glass, perlite, ZnO, $ZrO_2$, $SnO_2$, BiOCl, chromium oxide, BN, MgO flakes, $Si_3N_4$, graphite, $SiO_z$, $SiO_2/SiO_x/SiO_2$ ($0.03 \leq x \leq 0.95$), $SiO_{1.40-2.0}/SiO_{0.70-0.99}/SiO_{1.40-2.0}$, and $Si/SiO_z$ with $0.70 \leq z \leq 2.0$; or the platelet-shaped substrate is selected from flakes of Ag, Al, Au, Cu, Cr, Fe, Ge, Mo, Ni, Si, Ti, and alloys thereof.

5. The pearlescent pigment according to claim 1, wherein the pearlescent pigment comprising the platelet-shaped substrate and the metal oxide coating has the following layer structure:

| | | | |
|---|---|---|---|
| TRASUB | $TiO_2$ | | |
| TRASUB | $TiO_2/Fe_2O_3$ | | |
| TRASUB | $Fe_2TiO_5$ | | |
| TRASUB | $TiO_2$ | $SiO_2$ | $TiO_2$ |
| TRASUB | $TiO_2$ | $SiO_2$ | $TiO_2/Fe_2O_3$ |
| TRASUB | $(Sn,Sb)O_2$ | $SiO_2$ | $TiO_2$ |
| TRASUB | $TiO_2/Fe_2O_3$ | $SiO_2$ | $TiO_2/Fe_2O_3$ |
| TRASUB | $Cr_2O_3$ | $SiO_2$ | $TiO_2$ |
| TRASUB | $Fe_2O_3$ | $SiO_2$ | $TiO_2$ |
| TRASUB | TiO suboxides | $SiO_2$ | TiO suboxides |
| TRASUB | $TiO_2$ | $SiO_2$ | $TiO_2 + SiO_2 + TiO_2$ |
| TRASUB | $TiO_2 + SiO_2 + TiO_2$ | $SiO_2$ | $TiO_2 + SiO_2 + TiO_2$ |
| TRASUB | $TiO_2$ | $Al_2O_3$ | $TiO_2$ |
| TRASUB | $Fe_2TiO_5$ | $SiO_2$ | $TiO_2$ |
| TRASUB | $TiO_2$ | $SiO_2$ | $Fe_2TiO_5/TiO_2$ |
| TRASUB | STL | $TiO_2$ | | wherein TRASUB is a transparent, or semitransparent substrate having a low index of refraction, another layered silicate, glass, $Al_2O_3$, $SiO_z$, with $0.70 \leq z \leq 2.0$, and STL is a semi-transparent layer.

6. The pearlescent pigment according to claim 1, wherein the metal oxide/hydroxide layer consists of an oxide/hydroxide of aluminium, zirconium, or a mixture thereof; or ternary mixtures of zirconium oxide, aluminum oxide and zinc oxide, or zirconium oxide, aluminum oxide and magnesium oxide.

7. A pearlescent pigment comprising a platelet-shaped substrate, a metal oxide coating comprising:
   a metal oxide layer having a refractive index of greater than 1.8; and
   a protective layer,
   wherein the protective layer comprises a metal oxide/hydroxide layer and optionally boroxide, applied to which is an organic aftercoat of an acrylic copolymer,
   wherein the metal oxide/hydroxide of the protective layer is selected from oxides/hydroxides of silicon (silicon oxide, silicon oxide hydrate), aluminium, zirconium, magnesium, calcium, iron(III), yttrium, cerium, zinc and combinations thereof, and
   wherein the protective layer comprises 3 to 5% by weight aluminium oxide with 0.5 to 1.5% by weight boron oxide and about 5% by weight of the acrylic copolymer, each based on the weight of the pigment.

8. The pearlescent pigment according to claim 1, wherein the protective layer comprises aluminium oxide and optionally boroxide.

9. The pearlescent pigment according to claim 1, wherein the acrylic copolymer is a copolymer obtained by a process comprising the steps:

a1) polymerizing in a first step one or more ethylenically unsaturated monomers in the presence of at least one nitroxylether having the structural element

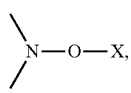

wherein X represents a group having at least one carbon atom and is such that the free radical X. derived from X is capable of initiating polymerization; or a2) polymerizing in a first step one or more ethylenically unsaturated monomers in the presence of at least one stable free nitroxyl radical

and a free radical initiator;

wherein at least one monomer used in the steps a1) or a2) is a $C_1$-$C_6$ alkyl or hydroxy $C_1$-$C_6$ alkyl ester of acrylic or methacrylic acid; and a second step b) comprising the modification of the polymer or copolymer prepared under a1) or a2) by a transesterification reaction, an amidation, hydrolysis or anhydride modification or a combination thereof.

10. The pearlescent pigment according to claim 9, wherein the acrylic copolymer is a copolymer of the formula shown below

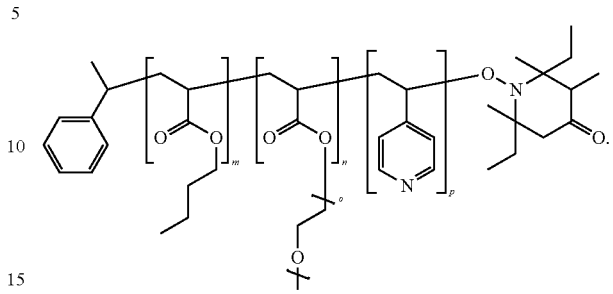

11. A process for producing the pigment according to claim 1, characterized in that
  (a) pearlescent pigment comprising a platelet-shaped substrate, and a metal oxide coating comprising a metal oxide layer having a refractive index of greater than 1.8 is suspended in water, the pH of the suspension is adjusted to about 3, then an aqueous solution of one or more (metal) salts selected from boron, silicon, aluminium, zinc, calcium, magnesium, zirconium, iron (III), yttrium and cerium is added to the suspension while keeping its pH constant with an aqueous alkali solution, and after addition, its pH is adjusted to about 7 to 8.5, and
  (b) a solution of the acrylic copolymer is added to the resulting suspension under stirring, and after addition, the suspension is filtered, washed with water and dried.

12. Paints, lacquers, printing inks, powder coatings, paper coatings, plastics, cosmetics, inks, glazes for ceramics and glasses, comprising the pigment according to claim 1.

* * * * *